(12) United States Patent
Ong et al.

(10) Patent No.: US 8,787,170 B2
(45) Date of Patent: Jul. 22, 2014

(54) METHODS AND SYSTEMS FOR EXISTENTIAL PROVISIONING OF FLEXIBLE LINE MODULES USING DISTRIBUTED CONTROL

(75) Inventors: Lyndon Y. Ong, Sunnyvale, CA (US); Michael A. Gazier, Ottawa (CA); Ian H. Duncan, Ottawa (CA)

(73) Assignee: Ciena Corporation, Hanover, MD (US)

(*) Notice: Subject to any disclaimer, the term of this patent is extended or adjusted under 35 U.S.C. 154(b) by 419 days.

(21) Appl. No.: 11/657,266

(22) Filed: Jan. 24, 2007

(65) Prior Publication Data

US 2008/0175154 A1 Jul. 24, 2008

(51) Int. Cl.
*H04L 12/56* (2006.01)
*H04L 12/28* (2006.01)
*H04L 12/26* (2006.01)

(52) U.S. Cl.
USPC .............................. 370/236; 370/392; 709/230

(58) Field of Classification Search
None
See application file for complete search history.

(56) References Cited

U.S. PATENT DOCUMENTS

| | | | | |
|---|---|---|---|---|
| 5,430,727 | A * | 7/1995 | Callon ........................... | 370/401 |
| 6,522,629 | B1 * | 2/2003 | Anderson, Sr. ................ | 370/236 |
| 6,956,847 | B2 * | 10/2005 | Heston et al. ................. | 370/353 |
| 7,088,718 | B1 * | 8/2006 | Srivastava ..................... | 370/392 |
| 7,366,109 | B2 * | 4/2008 | Ashwood-Smith ............ | 370/254 |
| 7,593,427 | B1 * | 9/2009 | Wongsonegoro et al. .... | 370/470 |
| 2001/0053149 | A1 * | 12/2001 | Mo et al. ....................... | 370/389 |
| 2002/0141342 | A1 * | 10/2002 | Furman et al. ................ | 370/235 |
| 2002/0191250 | A1 * | 12/2002 | Graves et al. ................. | 359/128 |
| 2003/0058850 | A1 * | 3/2003 | Rangarajan et al. .......... | 370/389 |
| 2003/0067928 | A1 * | 4/2003 | Gonda ........................... | 370/401 |
| 2003/0177382 | A1 * | 9/2003 | Ofek et al. ..................... | 713/200 |
| 2005/0048969 | A1 * | 3/2005 | Shaheen et al. ............. | 455/426.1 |
| 2006/0221865 | A1 * | 10/2006 | Hawbaker et al. ............ | 370/255 |
| 2007/0047465 | A1 * | 3/2007 | Kano ............................. | 370/254 |
| 2008/0049621 | A1 * | 2/2008 | McGuire et al. ........... | 370/236.2 |
| 2008/0049626 | A1 * | 2/2008 | Bugenhagen et al. ........ | 370/241 |

OTHER PUBLICATIONS

Ciena, "Ciena Announces CN 4200 FlexSelect Advanced Services Platform with Breakthrough 'Any Service, Any Where, Any Time' Technology", May 16, 2005, Ciena Corp., p. 1.*
Ciena Corp., "Ciena Announces CN 4200 FlexSelect Advanced Services Platform with Breakthrough 'Any Service, Any Where, U Any Time' Technology", May 16, 2005, pp. 1-2.*

* cited by examiner

*Primary Examiner* — Gregory Sefcheck
*Assistant Examiner* — Steve Young
(74) *Attorney, Agent, or Firm* — Clements Bernard PLLC; Christopher L. Bernard; Lawrence A. Baratta, Jr.

(57) ABSTRACT

The present invention utilizes control plane signaling to dynamically configure flexible, existential ports. The ports are referred to as existential as their nature can change over time depending on the present need of the network, and because the ports are flexible and reconfigurable to a plurality of bit rates and protocols. The present invention removes the constraints of provisioning individual ports and connections, such as from a network management system, and integrates the concept of flexible ports with signaling and control plane methods utilized for routing in modern networks. Advantageously, the present invention extends service providers' investments in equipment, and reduces operating expenses in providing systems that are able to dynamically deal with various network configurations and with low touch by automatically performing provisioning. The methods and systems of the present invention can be extended to other networks utilizing flexible ports, such as wireless radios and the like.

19 Claims, 4 Drawing Sheets

METHODS AND SYSTEMS FOR EXISTENTIAL PROVISIONING OF FLEXIBLE LINE MODULES USING DISTRIBUTED CONTROL

CROSS-REFERENCE TO RELATED APPLICATION(S)

This application incorporates by reference in its entirety for all purposes commonly assigned U.S. patent issued Aug. 31, 2006:

| Application No. | Title |
| --- | --- |
| 7,110,396 | "A SYSTEM FOR TRANSPORTING SUB-RATE DATA OVER A COMMUNICATION NETWORK" |

Furthermore, this application incorporates by reference in its entirety for all purposes, commonly assigned U.S. patent applications filed Aug. 31, 2006:

| Application No. | Title |
| --- | --- |
| 11/513,606 | "METHODS AND SYSTEMS FOR SESSION INITIATION PROTOCOL CONTROL OF NETWORK EQUIPMENT" |

Furthermore, this application incorporates by reference in its entirety for all purposes, commonly assigned U.S. patent applications filed Sep. 29, 2006:

| Application No. | Title |
| --- | --- |
| 11/540,786 | "METHODS AND SYSTEMS FOR EXTENSIBLE MARKUP LANGUAGE CONTROL OF NETWORK EQUIPMENT" |

FIELD OF THE INVENTION

The present invention relates generally to port provisioning in networks. More specifically, the present invention relates to utilizing control plane signaling to dynamically configure flexible, existential ports in networks.

BACKGROUND OF THE INVENTION

Current methods and systems for port provisioning in network elements typically involve a network management platform, such as an element management system (EMS), network management system (NMS), operations support system (OSS), or a local craft interface terminal. The network management platform is used to communicate with a provisioning system of each network element, possibly through a proxy server. For example, a typical flow would be a manual order to add a gigabit Ethernet (GbE) connection across the network including possible human intervention to physically add or replace a component that supports the desired GbE interface. First, the terminating and originating network elements must be equipped with an open GbE port. The order is given to the proper GbE port on each network element, and then a path is provisioned across the network. The path is capable of carrying the GbE between the two endpoints and with the bandwidth and other parameters as specified under the provisioning order. Proxies may be involved, for example the OSS might provision the EMS which might communicate with the network element. Additionally, in some cases the paths may be set up automatically across the network using routing protocols. In other words, the path may be provisioned from the top down.

Most network elements have the ability to switch between different standards at the same rate, such as between SONET and SDH. For example, most network elements support an OC-12 with the same port that supports an STM-4, and vice versa. Additionally, some Ethernet ports support Fast Ethernet (100 Mb/s) and GbE with the same hardware. Here, the ports support the same general framing structure with minor differences in the overhead processing.

Recent advances allow ports to be flexible, meaning they can change between rates and protocols solely based on software provisioning. For example, a flexible port can support a range of rates (e.g., 30 Mb/s to 10.7 Gb/s) and protocols (e.g., SONET, SDH, Ethernet, Optical Transport Network (OTN), Enterprise Systems Connection (ESCON), Infiniband, Fibre Channel, and the like) with the same physical hardware, relying solely on software control for determining the port's configuration. An example of such flexible ports includes FlexSelect™ ports available from CIENA Corporation of Linthicum, Md.

Many networks utilize signaling to connect two network elements across the network. These methods are generally known in the art as routing and connection control methods. For example, an Automatically Switched Optical Network (ASON) is a network based on a technology enabling the automatic delivery of transport services; specifically an ASON can deliver not only leased line connections but also other transport services, such as soft permanent and switched optical connections, using signaling. Also, Generalized Multi-Protocol Label Switching (GMPLS) allows traffic paths to be set up through a switched network automatically using signaling.

Provider Backbone Transport (PBT) is a set of enhancements to Ethernet technology that allows use of Ethernet as a carrier class transport network. This uses the concepts of VLAN tagging as per IEEE 802.1Q, Q-in-Q as per IEEE 802.1ad and MAC-in-MAC as per IEEE 802.1ah, but disables the concept of flooding/broadcasting and spanning tree protocol. The objective for PBT is to use Ethernet for connection oriented services as is the case with present SDH/SONET transport by removing complexities of control behaviors involved with the present Ethernet LAN that are unnecessary to support connection oriented forwarding of Ethernet packets. It augments the operational administration and maintenance (OAM), adapting key methods established in SDH/SONET world, by using additional extensions based on IEEE 802.1ag. In its initial form PBT only defined behaviors for the data plane and OAM functions. Extensions to this base are anticipated for control plane; either with routing and path signaling functionality derived from GMPLS, Transport Multi-Protocol Label Switching (TMPLS), ASON or some similar PBT-specific routing and path signaling protocol suite to complete the objective the overall objective of transforming Ethernet to be an effective tool for connection oriented services.

Resource Reservation Protocol (RSVP) described in RFC 2205 is a network layer protocol designed to reserve resources across a network. RSVP provides receiver-initiated setup of resource reservations for multicast or unicast data flows with scaling and robustness. RSVP can be used by network elements to request or deliver specific levels of quality of service (QoS) for application data streams or flows. Also, Private Network to Network Interface (PNNI) is an Asynchronous Transfer Mode (ATM) network-to-network signaling protocol providing mechanisms to support scalable, QoS-based ATM routing and switch-to-switch switched virtual connection (SVC) interoperability. PNNI also includes a hierarchical, dynamic link-state routing protocol With flexible ports, port provisioning utilizing a network management platform for configuration results in rigidity and requires the network management platform to be aware of nodal constraints, such as link occupancy, in order to create routes. Port provisioning using a network management platform also requires contact between the network management platform and both endpoints of the connection, which involves more processing resources and communication by the network management platform, and may not be possible in all cases, such as when different platforms are used to manage each endpoint. Thus, methods and systems are needed which combine the concepts of flexible line modules with distributed control planes.

BRIEF SUMMARY OF THE INVENTION

According to various exemplary embodiments of the present invention, control plane signaling is used to dynamically configure existential ports. The ports are referred to as existential as their nature can change over time depending on the present need of the network, and because the ports are flexible and reconfigurable to a plurality of bit rates and protocols solely based on software provisioning.

The present invention removes the constraints of provisioning individual ports and connections, such as from a network management system, and integrates the concept of flexible ports with signaling and control plane methods utilized for connection provisioning in modern networks. Advantageously, the present invention extends service providers' investments in equipment, allowing reuse in various modes as needed, and reduces operating expenses ("opex") in providing systems that are able to dynamically deal with various network configurations and with low touch by automatically performing provisioning. The methods and systems of the present invention can be extended to other networks utilizing flexible ports, such as wireless radios and the like.

In an exemplary embodiment of the present invention, a method for existential provisioning of flexible ports in a network using distributed control includes defining a port type and a destination reference, provisioning a first port responsive to the port type, provisioning a path across the network to a second port utilizing signaling and a control plane, and connecting the first and second ports through the path, wherein the first port includes a flexible, existential port capable of a plurality of protocols based upon software provisioning. The method further includes the steps of communicating the port type to the second port responsive to the destination reference utilizing signaling and the control plane, and provisioning the second port responsive to the communicating step, wherein the second port includes a flexible existential port capable of a plurality of protocols based upon software provisioning. Optionally, the defining step is performed by a client through signaling responsive to an incoming port or a network management system including one or more of an element management system, network management system, operations support system, or a local craft interface terminal. The destination reference includes one or more of an End System Address (ESA), Internet Protocol (IP) address, Ethernet address, Transport Network Assigned (TNA) address, or Session Initiation Protocol (SIP) Uniform Resource Identifier (URI). The port type includes one or more of SONET, SDH, Ethernet, Optical Transport Network, ESCON, Infiniband, Fibre Channel, InfiniBand, wireless, and cable. Each of the first and second ports are on flexible port line modules, and the flexible port line modules are configured in network elements including one or more of a switch, router, multi-service provisioning platform, optical cross-connect, dense wave division multiplexing element, coarse wave division multiplexing element, cable head-end, wireless base station, and wireless handset. The control plane includes one or more of Automatically Switched Optical Network, Generalized Multi-Protocol Label Switching, or Provider Backbone Transport with path routing extensions, and the signaling includes one or more of Resource Reservation Protocol, Label Distribution Protocol, Private Network to Network Interface, Session Initiation Protocol, Extensible Mark-up Language, Rapid Spanning Tree Protocol, a Type-Length-Value added to the Resource Reservation Protocol—Traffic Engineering, Session Description Protocol (SDP), or proprietary signaling.

In another exemplary embodiment of the present invention, a method for existential provisioning of flexible ports in a network using distributed control includes connecting to a first port, detecting the protocol connected to the first port, configuring the protocol on the first port to the protocol detected, determining a destination using an identification mechanism appropriate to the protocol detected, provisioning a path across the network responsive to the destination utilizing signaling and a control plane, configuring the protocol on a second port responsive to the protocol on the first port, wherein the second port is identified by the destination, and connecting the first and second ports through the path. The first and second ports each include a flexible, existential port operable to support a plurality of bit rates and a plurality of protocols. The destination includes one or more of an End System Address (ESA), Transport Network Assigned (TNA) address, Internet Protocol (IP) address, Ethernet address, or Session Initiation Protocol (SIP) Uniform Resource Identifier (URI). Optionally, the path includes qualifiers including one or more of quality-of-service, wavelength, and link. The protocol includes one or more of SONET, SDH, Ethernet, Optical Transport Network, ESCON, Infiniband, Fibre Channel, InfiniBand wireless, and cable. Each of the first and second ports are on flexible port line modules, and the flexible port line modules are configured in network elements including one or more of a switch, router, multi-service provisioning platform, optical cross-connect, dense wave division multiplexing element, coarse wave division multiplexing element, cable head-end, wireless base station, and wireless handset. The control plane includes one or more of Automatically Switched Optical Network, Generalized Multi-Protocol Label Switching, or Provider Backbone Transport with path routing extensions, and the signaling includes one or more of Resource Reservation Protocol, Label Distribution Protocol; Private Network to Network Interface, Session Initiation Protocol, Extensible Mark-up Language, Rapid Spanning Tree Protocol, a Type-Length-Value added to the Resource Reservation Protocol—Traffic Engineering, Session Description Protocol (SDP), or proprietary signaling.

In yet another exemplary embodiment of the present invention, a method for existential provisioning of a flexible software-defined, wireless radio in a network includes communicating to a base station, determining the protocol of the base station, configuring the protocol of the wireless radio responsive to the protocol of the base station, wherein the wireless radio is configured to support multiple protocols and frequencies based upon software provisioning, and negotiating a higher layer protocol between the base station and the wireless radio. The negotiating step includes determining the higher layer protocol of the base station, and configuring the wireless radio responsive to the higher layer protocol.

In yet another exemplary embodiment of the present inventions, a network configured for existential provisioning of flexible ports using distributed control includes a plurality of network elements each including one or more flexible ports, wherein the flexible ports are operable to support a plurality of bit rates and a plurality of protocols based upon software provisioning, a control plane connected to the plurality of network elements, and signaling on the control plane configured to provision the one or more flexible ports and to determine a path through the network. Optionally, the signaling configures the one or more flexible ports and determines the path responsive to an input from a network management system or from another network element. Alternatively, the signaling configures the one or more flexible ports and determines the path responsive to detecting an input port type and destination reference on one of the one or more flexible ports. The control plane includes one or more of Automatically Switched Optical Network, Generalized Multi-Protocol Label Switching, or Provider Backbone Transport with path routing extensions, and the signaling includes one or more of Resource Reservation Protocol, Label Distribution Protocol, Private Network to Network Interface, Session Initiation Protocol, Extensible Mark-up Language, Rapid Spanning Tree Protocol, a Type-Length-Value added to the Resource Reservation Protocol—Traffic Engineering, Session Description Protocol (SDP), or proprietary signaling.

BRIEF DESCRIPTION OF THE DRAWINGS

The present invention is illustrated and described herein with reference to the various drawings, in which like reference numbers denote like method steps and system components, as appropriate, and in which.

DETAILED DESCRIPTION OF THE INVENTION

Figure 1A:
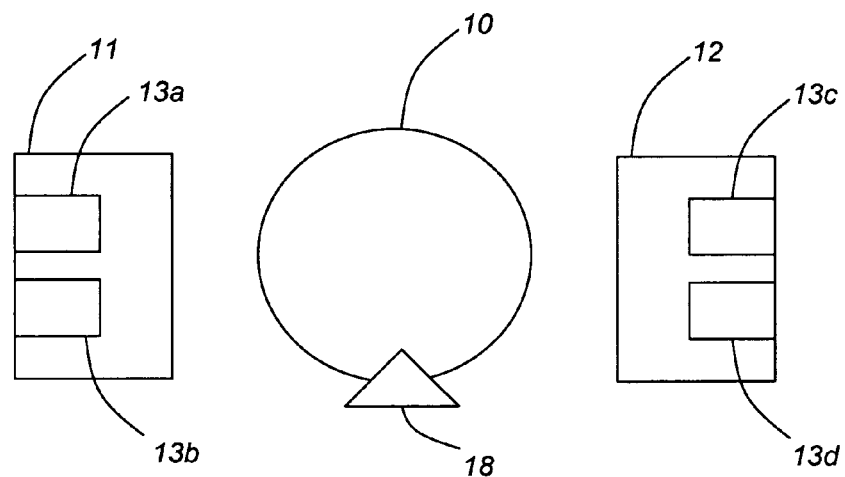
FIGS. 1a and 1b are illustrations of an enterprise private network or service provider network depicting non-provisioned ports and existential ports provisioned according to an exemplary embodiment of the present invention.

According to various exemplary embodiments of the present invention, control plane signaling is used to dynamically configure existential ports. The ports are referred to as existential as their nature can change over time depending on the present need of the network, and because the ports are flexible and reconfigurable to a plurality of bit rates and protocols. Ports are part of line modules in network elements, and each line module typically includes one or more ports. For example, a flexible line module can include four or eight ports, each capable of making a network connection and each port capable of flexible, existential provisioning.

The present invention removes the constraints of provisioning individual ports and connections, such as from a network management system, and integrates the concept of flexible ports with signaling and control plane methods utilized for routing in modern networks. Advantageously, the present invention extends service providers' investments in equipment, allowing reuse in various modes as needed, and reduces operating expenses ("opex") in providing systems that are able to dynamically deal with various network configurations and with low touch by automatically performing provisioning. The methods and systems of the present invention can be extended to other networks utilizing flexible ports, such as wireless radios and the like.

In an exemplary embodiment of the present invention, flexible port modules are provisioned through distributed control such as GMPLS, ASON, PBT with routing and path signaling extensions, or the like and connections across an optical network are made using protocols such as Resource Reservation Protocol (RSVP), Label Distribution Protocol (LDP), Private Network to Network Interface (PNNI), or the like. Future developed signaling protocols and control planes are also contemplated by the present invention.

The flexible, existential port modules can support different identities, such as GbE, Fibre Channel (e.g., 1, 2, or 4 Gb/s), OC-12/STM-4, and the like. The flexible, existential ports are capable of the multiple bit rates and multiple protocols based solely upon software provisioning. Additionally, the ports can automatically detect an incoming bit rate and protocol, and be configured to adjust accordingly.

The network connections can support a variety of protocol types such as SONET/SDH, Optical Transport Network (OTN), storage area networking (SAN), wavelengths, wireless protocols, cable protocols, and the like. Alternative implementations including the use of layer-specific control protocols, such as RSVP, or layer-independent service protocols, such as Session Initiation Protocol (SIP) and Extensible Mark-up Language (XML), are also contemplated. Implementations using SIP can be Internet Protocol Multimedia Subsystem (IMS)-compliant.

The control plane signaling dynamically configures the framing done at the endpoints of a transport connection, and this framing can be configured on a dynamic basis with flexible, existential ports. The signaling can be direct or through a proxy, such as SIP in an IMS context. In one embodiment, the originating network element (e.g., switch or the like) configures the source port based on the requested service, then uses the control plane to indicate its service type to the destination network element so that the egress ports can be configured to be compatible with this services. Then, a connection protocol is used to form a connection through the network from the source port to the egress port. Advantageously, this reduces line card inventories, training, provisioning time, and the like associated with existing provisioning methods.

Figure 1B:
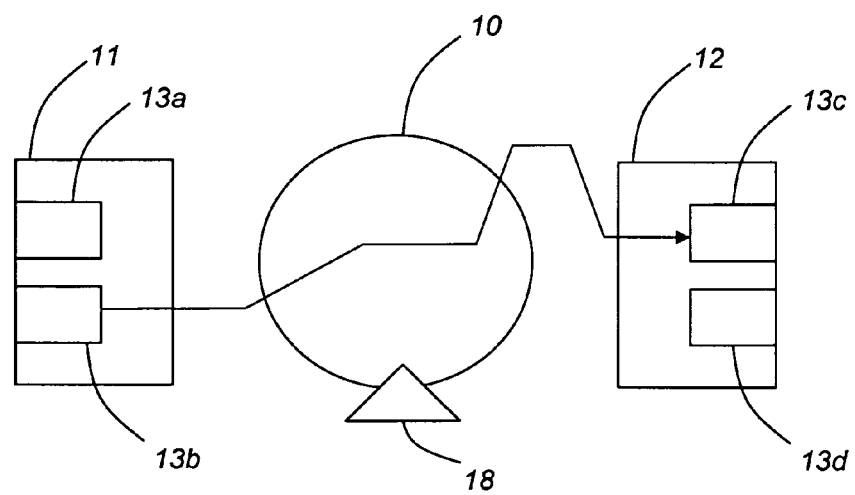

Referring to FIGS. 1a and 1b, an enterprise private or service provider network 10 includes two network elements 11,12 each with ports 13. The network elements 11,12 can include a switch, router, multi-service provisioning platform (MSPP), optical cross-connect (OXC), dense wave division multiplexing (DWDM) platform, coarse wave division multiplexing (CWDM) platform, wireless base station, wireless handset, cable head-end, or the like. For illustration purposes, FIGS. 1a and 1b depict two network elements 11,12, and it should be noted that additional network elements can be included, such as intermediate nodes, and that the additional network elements can also be configured utilizing the methods of the present invention.

Each of the network elements 11,12 include one or more flexible line modules equipped with flexible ports 13. The ports 13 are referred to herein as existential ports because their nature can change over time depending on the present need of the network 10. The flexible ports 13 can support a range of rates, such as 30 Mb/s to 10.7 Gb/s, and a range of protocols, such as SONET (such as OC-3, OC-12, OC-48, and OC-192), SDH (such as STM-1, STM-4, STM-16, and STM-64), Ethernet (such as PBT, Q-in-Q, and the like), Internet Protocol (IP), OTN, ESCON, Fibre Channel (such as 1 Gbit/s, 2 Gbit/s 4 Gbit/s, and 8 Gbit/s FC), Infiniband, Asynchronous Transfer Mode (ATM) (such as ATM ports including Switching ATM or FR (frame relay), Ethernet, T1/E1, T3/E3, and the like), wireless, cable, and the like.

A service provider wishes to connect ports 13 between the network elements 11,12 across the network 10. As described herein, traditionally, the provider utilizes a network based management system 18, such as an EMS, NMS, OSS, or the like, to individually provision ports at both network elements 11,12, and a path through the network 10. The present invention removes these constraints in provisioning, and integrates the concept of flexible ports with signaling and control place methods utilized for routing in modern networks In an exemplary embodiment of the present invention, the network element 11 is given a port type by the management system 18 (e.g., EMS, NMS, OSS, or the like) or by a network element 11 (e.g., client signaling responsive to an incoming port), and a destination reference (e.g., End System Address (ESA), Internet Protocol (IP) address, Ethernet address, SIP Uniform Resource Identifier (URI), Transport Network Assigned (TNA) address, or the like). The control plane communicates with signaling to ports 13b and 13c which are to be provisioned as the specified port type, such as GbE. Then using the destination reference, the network element 11 communicates with network element 12. Using normal network signaling and control plane methods, a path possibly including qualifiers, such as quality-of-service (QoS), wavelength, is set up across the network 10 between network elements 11 and 12. Now, the port 13c in network element 12 is connected (with appropriate existential qualities, such as QoS) possibly using a secondary protocol or using a type-length-value (TLV) in the primary protocol. Note, intermediate network elements can also be included, and their associated existential ports configured if required by the signaling and control plane methods.

The signaling protocol could be RSVP, LDP, PNNI, SIP, or XML-based as required by the network 10. Examples of the secondary protocol include Rapid Spanning Tree Protocol (RTSP), a TLV added to the Resource Reservation Protocol— Traffic Engineering (RSVP-TE), Session Description Protocol (SDP), a proprietary signaling, or the like.

The signaling protocol can specify the port type of the destination port 13c. For example, the signaling protocol can specify port 13c should be configured to a GbE. Further, the signaling protocol can first determine that the ports 13b and 13c are first capable of the desired port type. For example, if the ports 13b and 13c are not GbE ports, but rather SONET/SDH, such as an OC-12c capable port, then the signaling protocol can configure the ports 13b and 13c to support GbE over SONET (or GbE over channelized OTN in another example).

Once the source port 13b, network path, and the destination port 13c are configured by the signaling protocol, a connection, such as a GbE connection, is formed in the network 10, as depicted in FIG. 1b.

Figure 2A:
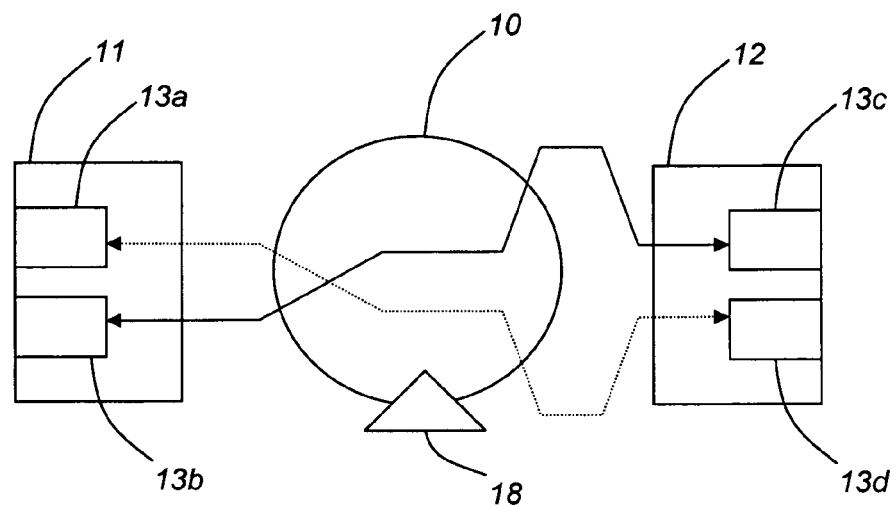
FIGS. 2a and 2b are illustrations of the enterprise private network or service provider network depicting a second connection and ports initially provisioned and re-provisioned according to an exemplary embodiment of the present invention.
Figure 2B:
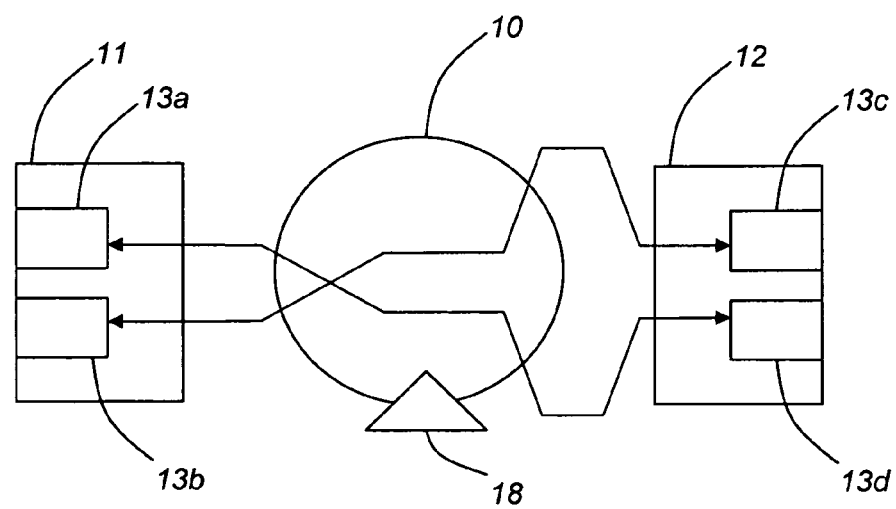

Referring to FIGS. 2a and 2b, another connection, such as Fibre Channel or GbE, is depicted between network elements 11 and 12 in the network 10. This connection is formed between ports 13a and 13d using a similar process as described herein in FIGS. 1a and 1b, possibly using a different signaling and control plane, and addressing method. FIG. 2a illustrates the initial connection provisioned between ports 13a and 13d, such as a 2 Gb/s Fibre Channel connection. Due to the existential nature of the ports 13, the Fibre Channel connection in FIG. 2a (dotted line connection between ports 13a and 13d) is shown changed to a GbE connection in FIG. 2b. Here, the source port 13a and the destination port 13d are dynamically reconfigured using the methods of the present invention, possibly even to different sub-types such as GbE versus GbE over SONET/SDH/OTN, or GbE load balanced over a T1 over SONET, or the like.

Figure 3A:
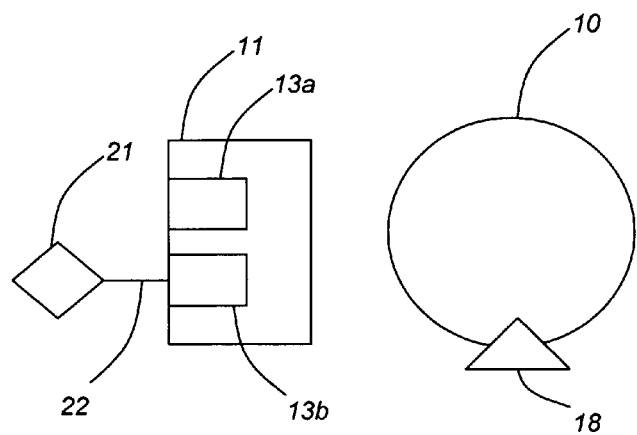
FIGS. 3a and 3b are illustrations of source and target elements connected to an enterprise private network or service provider network to provision ports according to another exemplary embodiment of the present invention.
Figure 3B:
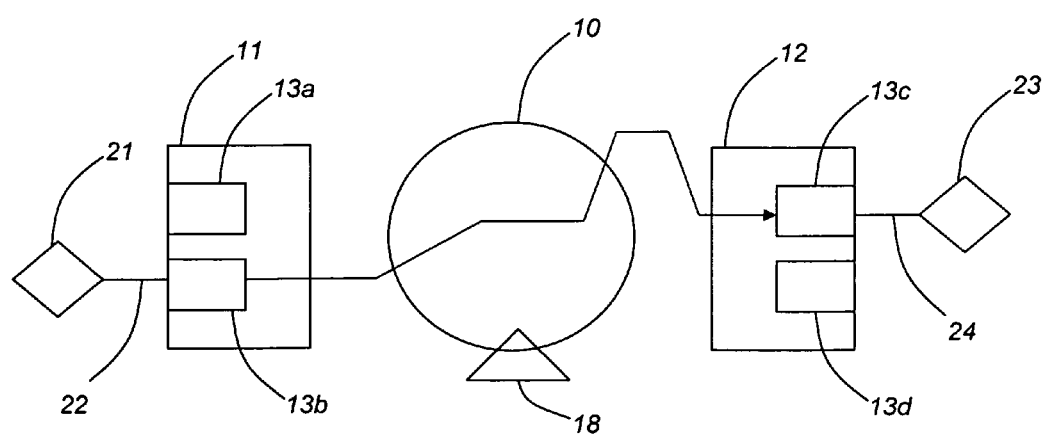

Referring to FIGS. 3a and 3b, in another exemplary embodiment of the present invention, the configuration of ports 13 is done automatically instead of utilizing the management system 18 to specify type and destination. In FIG. 3a, a source element 21, such as an Network Termination Equipment (NTE), Customer Premises Equipment (CPE), or another network element 11, connects to the port 13b on the network element 11 through a link 22. The link 22 is utilized to activate signaling between the source element 21 and the network element 11. For example, the source element 21 can initiate the link 22 in a GbE mode. Now, network element 11 detects this, for example by trying many protocols until one succeeds or based on out-of-band signaling on the link 22. Once network element 11 successfully detects the protocol on link 22, it configures port 13b to the appropriate protocol.

At this point, source element 21 can invoke the destination service using an appropriate identification mechanism, such as an Internet Protocol (IP) address or SIP URI, at which point the previously described processes can occur. It is noted that some additional steps can occur, such as using Dynamic Host Configuration Protocol (DHCP) to give source element 21 an address, using a broadband distribution system (BDS) to identify destinations, and granting access using authentication and registration methods (e.g., those described in IMS).

Once the link 22 is provisioned between the source element 21 and the network element 11, a path is provisioned in the network 10 to a target element 23, such as a switch, application server, another network element, mobile handset, or the like. In FIG. 3b, the target element 23 connects to port 13c on the network element 12 through a link 24. The link 24 can also be provisioned according to the methods described herein with regards to link 22.

Using normal network signaling and control plane methods, a path possibly including qualifiers, such as quality-of-service (QoS), wavelength, and the link, is set up across the network 10 between network elements 11 and 12, connecting source element 21 to target element 23.

Configuration profiles, such as QoS or port type, can be negotiated at the start, such as from a list of preferences, or they can be renegotiated once a connection is achieved across part or the entire network 10. This is because the ports 13 of the present invention are existential, and not fixed to a specific behavior. Mixed methods utilizing configurations and automatic processes as described herein are also contemplated by the present invention.

In some cases, network elements 11,12 can have policies or other reasons and mechanisms to not allow flexible, existential port behavior in which case we refer to this as an uncarved port. Such a behavior is typically determined through a policy which might be communicated through Common Open Policy Service (COPS) or a subsequent protocol.

In another exemplary embodiment of the present invention, the provisioning methods can be utilized in a network 50 containing software-defined wireless radios. A software-defined wireless radio system is a radio communication system which can tune to any frequency band and receive any modulation across a large frequency spectrum by means of a programmable hardware which is controlled by software. The wireless radio performs significant amounts of signal processing in a general purpose computer, or a reconfigurable piece of digital electronics.

Figure 4:
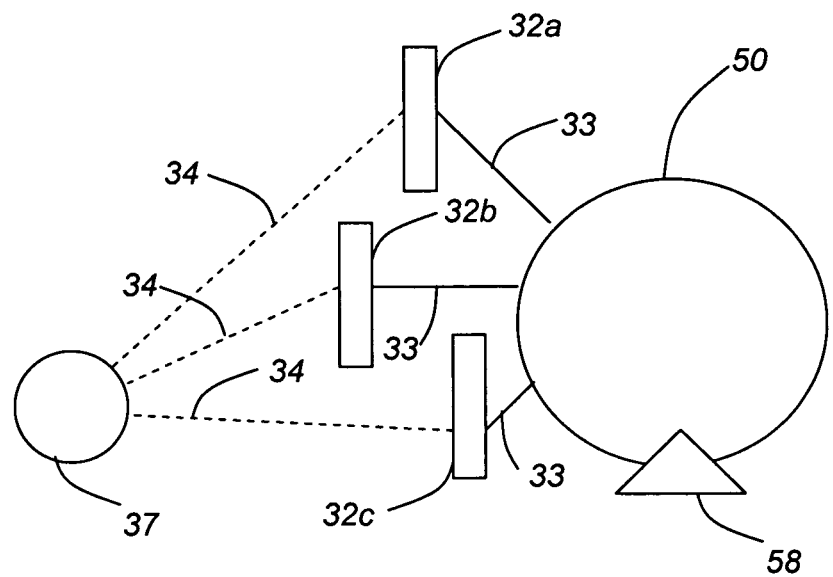
FIG. 4 is an illustration of a wireless network including base stations and a user radio according to another exemplary embodiment of the present invention.

Referring to FIG. 4, base stations 32a,32b,32c can connect to the network 50 through links 33, such as copper, fiber, Ethernet, ATM, IP, TDM, or the like. The base stations 32a, 32b,32c can be configured to utilize on-air wireless protocols, such as Code Division Multiple Access (CDMA), Wideband CDMA (W-CDMA), High-Speed Downlink Packet Access (HSDPA), High-Speed Uplink Packet Access (HSUPA), Global System for Mobile Communications (GSM), General Packet Radio Service (GPRS), Enhanced Data rates for GSM Evolution (EDGE), Universal Mobile Telecommunications System (UMTS), Evolution-Data Optimized (EV-DO), WiFi (IEEE 802.11), WiMAX (IEEE 802.16), Wireless Broadband (WiBRO), Bluetooth, Ultra-wideband (UWB), or the like.

Software radios, such as a user radio 37, have a partial or full ability to reconfigure themselves according to the need and to ambient conditions. For example, software radios are configured to support multiple protocols and frequencies based upon software provisioning. The provisioning mechanisms described herein can also apply to such protocols and physical interfaces, including the appropriate signaling mechanisms of associated networks or hybrid on-air/wireline networks, including in Fixed Mobile Convergence (FMC) scenarios.

One such instantiation determines network availability and position of a user, where the user could be a subscriber or an enterprise. In FIG. 4, the user's radio 37 determines it has access to three network access base stations 32a,32b,32c, and the type of capabilities each has, or at least the mode each is currently operating in. For example, base station 32a could be GSM, base station 32b could be WiFi, and base station 32c could be WiMAX. In another example, all base stations 32a, 32b,32c could be the same protocol. In yet another example, there is an addition of a wired link 33, such as T1 or 100BaseT Ethernet, back to the network 50.

The radio 37 communicates to the base stations 32a,32b, 32c possible during a sequential start-up mechanism, or somehow using a future all-bands identify mechanism, or using a location-based trigger (e.g., using Global Positioning System (GPS), we should know what base stations 32a,32b, 32c are in reach given a map of the area, possibly itself accessed over a wireless medium).

The user's software radio 37 chooses one or more of the base stations 32a,32b,32c to connect to, and the software radio 37, such as in a handset or CPE, is properly configured using the existential provisioning methods of the present invention.

Figure 5:
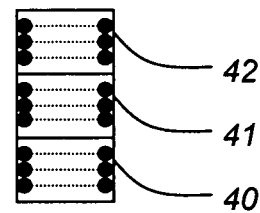
FIG. 5 is an illustration of a wireless software radio stack according to an exemplary embodiment of the present invention.

Referring to FIG. 5, a protocol stack is depicted in the radio 37, according to an exemplary embodiment of the present invention. The protocol stack includes a radio protocol layer 40 including software and hardware (both reconfigurable and fixed), link layer(s) 41, and higher layers 42 such as Ethernet, ATM, IP, or the like.

Once a basic communication link 34 and layer is established between the radio 37 and one or more of the base stations 32a,32b,32c, higher layer 42 protocols can be negotiated. These higher layer 42 protocols can be in part configured according to the provisioning methods described herein. For example, the radio 37 might be best served in an ATM network, and the base station 32 and network link 33 are configured to ATM as is the on-air part of the protocol, if application. In another example, the base station 32 could be configured to an Ethernet protocol, such as WiMAX or WiFi. The present invention allows the radios 37 to be provisioned automatically based upon the protocols in the network 50 and at the base stations 32a,32b,32c. Advantageously, such provisioning methods allow the use of a single radio 37 to cover multiple protocols on the base stations 32a,32b,32c.

The systems and methods of the present invention described herein can also be utilized for security giving a network the ability to change protocols dynamically similar to channel hopping schemes utilized in radio systems. Here, the network could dynamically change the protocol of one or more flexible, existential ports periodically or responsive to a condition utilizing signaling and the control plane.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A method for existential provisioning of flexible ports in a network using distributed control, comprising:
    defining a port type and a destination reference on a flexible port module through detecting an incoming signal;
    provisioning a first port responsive to the port type for an output of the first port;
    provisioning a path at a physical layer across the network to a second port utilizing signaling over a control plane separate from a traffic connection, wherein the provisioned path comprises configuring a physical path over a physical medium, wherein the provisioning comprises provisioning ports on intermediate network elements to provide the path with the signaling and the control plane, and wherein the second port is provisioned in terms of rate and format responsive to the provisioning of the first port in terms of rate and format communicated through the signaling over the control plane without using a network management system to provision the first port or the second port at a physical layer and the physical path; and
    connecting the first and second ports through the path;
    wherein the first port comprises a flexible, existential port capable of a plurality of protocols based upon software provisioning and based upon automatic detection of an incoming bit rate and protocol;
    wherein the destination reference comprises one or more of an End System Address (ESA), a Transport Network Assigned (TNA) address, or a Session Initiation Protocol (SIP) Uniform Resource Identifier (URI), and wherein the second port is automatically configured responsive to the destination reference; and
    wherein the signaling comprises utilizing type-length-value (TLV) fields in messages on the control plane to cause the second port to be provisioned in terms of rate and format responsive to the provisioning of the first port in lieu of the network management system.

2. The method of claim 1, further comprising:
communicating the port type to the second port responsive to the destination reference utilizing signaling and the control plane, wherein the communicating is performed without requiring a management system to set up the second port, and wherein the path at the physical layer is not provisioned prior to communicating the port type; and
provisioning the second port responsive to the port type associated with and communicated from the first port;
wherein the second port comprises a flexible, existential port capable of a plurality of protocols based upon software provisioning.

3. The method of claim 1, wherein the defining step is performed by a client through a network management system comprising one or more of an element management system, network management system, operations support system, or a local craft interface terminal.

4. The method of claim 1, wherein the port type comprises one or more of SONET, SDH, Ethernet, Internet Protocol, Optical Transport Network, ESCON, Infiniband, Fibre Channel, Asynchronous Transfer Mode, wireless, and cable.

5. The method of claim 1, wherein each of the first and second ports are on flexible port line modules.

6. The method of claim 5, wherein the flexible port line modules are configured in network elements comprising one or more of a switch, router, optical cross-connect, dense wave division multiplexing element, coarse wave division multiplexing element, cable head-end, wireless base station, and wireless handset.

7. The method of claim 1, wherein the control plane comprises one or more of Automatically Switched Optical Network, or Provider Backbone Transport with path routing extensions; and
wherein the signaling comprises one or more of Resource Reservation Protocol, Label Distribution Protocol, Private Network to Network Interface, Session Initiation Protocol, Extensible Mark-up Language, Rapid Spanning Tree Protocol, a Type-Length-Value added to the Resource Reservation Protocol—Traffic Engineering, Session Description Protocol (SDP), or proprietary signaling.

8. A method for existential provisioning of flexible ports in a network using distributed control, comprising:
connecting to a first port on a flexible port module;
detecting the protocol connected to the first port;
configuring the protocol for an output on the first port to the protocol detected;
determining a destination using an identification mechanism appropriate to the protocol detected;
provisioning a path at a physical layer across the network responsive to the destination utilizing signaling over a control plane separate from a traffic connection, wherein the provisioned path comprises configuring a physical path over a physical medium, wherein the provisioning comprises provisioning ports on intermediate network elements to provide the path with the signaling over the control plane, and wherein, prior to the provisioning, the path does not exist across the network;
configuring the protocol on a second port in terms of rate and format responsive to the protocol on the first port in terms of rate and format as communicated by the first port through the signaling over the control plane prior to physically forming a traffic connection in the network between the first port and the second port, wherein the second port is identified by the destination, and wherein the configuring is performed without requiring a management system to set up the second port; and
connecting the first and second ports through the path;
wherein the first and second ports each comprise a flexible, existential port operable to support a plurality of bit rates and a plurality of protocols based upon automatic detection of an incoming bit rate and protocol;
wherein the first port, the intermediate network elements, the second port, and the path are provisioned automatically without utilizing a management system to specify the protocol at a physical layer and the destination of various ports;
wherein the destination comprises one or more of an End System Address (ESA), a Transport Network Assigned (TNA) address, or a Session Initiation Protocol (SIP) Uniform Resource Identifier (URI), and wherein the second port is automatically configured responsive to the destination reference; and
wherein the signaling comprises utilizing type-length-value (TLV) fields in messages on the control plane to cause the second port to be provisioned in terms of rate and format responsive to the provisioning of the first port in lieu of the network management system.

9. The method of claim 8, wherein the path comprises qualifiers comprising an optical wavelength.

10. The method of claim 8, wherein the protocol comprises one or more of SONET, SDH, Ethernet, Internet Protocol, Optical Transport Network, ESCON, Infiniband, Fibre Channel, Asynchronous Transfer Mode, wireless, and cable.

11. The method of claim 8, wherein each of the first and second ports are on flexible port line modules.

12. The method of claim 11, wherein the flexible port line modules are configured in network elements comprising one or more of a switch, router, optical cross-connect, dense wave division multiplexing element, coarse wave division multiplexing element, cable head-end, wireless base station, and wireless handset.

13. The method of claim 8, wherein the control plane comprises one or more of Automatically Switched Optical Network or Provider Backbone Transport with path routing extensions; and
wherein the signaling comprises one or more of Resource Reservation Protocol, Label Distribution Protocol, Private Network to Network Interface, Session Initiation Protocol, Extensible Mark-up Language, Rapid Spanning Tree Protocol, a Type-Length-Value added to the Resource Reservation Protocol—Traffic Engineering, Session Description Protocol (SDP), or proprietary signaling.

14. A method for existential provisioning of a flexible software-defined, wireless radio in a network, comprising:
communicating to a base station utilizing Provider Backbone Transport with path routing extensions;
determining the protocol of the base station and a destination reference based on the communicating;
configuring the protocol of the wireless radio in terms of rate and format responsive to the protocol of the base station in terms of rate, format, and the destination reference as communicated by the base station through signaling prior to physically forming a traffic connection in the network between the base station and the wireless radio, wherein the wireless radio is configured at a physical layer to support multiple protocols and frequencies based upon software provisioning and based upon automatic detection of an incoming bit rate and protocol without utilizing a management system therefor; and negotiating a higher layer protocol between the base station and the wireless radio;
wherein the destination comprises one or more of an End System Address (ESA), a Transport Network Assigned (TNA) address, or a Session Initiation Protocol (SIP) Uniform Resource Identifier (URI), and wherein the wireless radio is automatically configured responsive to the destination reference; and
wherein the signaling comprises utilizing type-length-value (TLV) fields in messages on the control plane to cause the second port to be provisioned in terms of rate and format responsive to the provisioning of the first port in lieu of the management system.

15. The method of claim 14, wherein the negotiating step comprises determining the higher layer protocol of the base station, and configuring the wireless radio responsive to the higher layer protocol.

16. A network configured for existential provisioning of flexible ports using distributed control, comprising:
a plurality of network elements interconnected through a physical medium operating any of Synchronous Optical Network (SONET), Synchronous Digital Hierarchy (SDH), or Optical Transport Network (OTN) and each comprising one or more flexible ports, wherein the flexible ports are operable to support an input comprising a plurality of bit rates and a plurality of protocols based upon software provisioning and based upon automatic detection of an incoming bit rate and protocol and to encapsulate the input into SONET, SDH, or OTN;
a control plane connected to the plurality of network elements; and
signaling over the control plane separate from a traffic connection configured to provision the one or more flexible ports in terms of rate, format, and a destination reference such that they are compatible and to determine a path through the network, wherein the determined path comprises configuring a physical path over the physical medium comprising an available optical wavelength, and wherein the provisioning comprises provisioning ports on intermediate network elements of the plurality of network elements to provide the path with the signaling over the control plane, wherein, prior to the provisioning, the path does not exist across the network, and
wherein the one or more flexible ports are configured to adapt to a particular rate and protocol based on the signaling prior to physically forming a traffic connection in the network between the one or more flexible ports;
wherein the flexible ports on the plurality of network elements are provisioned at a physical layer automatically, upon detection of an incoming signal to an ingress port, without utilizing a management system and without specifying the rate, the format, and the destination reference;
wherein the destination comprises one or more of an End System Address (ESA), a Transport Network Assigned (TNA) address, or a Session Initiation Protocol (SIP) Uniform Resource Identifier (URI), and wherein the second port is automatically configured responsive to the destination reference; and
wherein the signaling comprises utilizing type-length-value (TLV) fields in messages on the control plane to cause the second port to be provisioned in terms of rate and format responsive to the provisioning of the first port.

17. The network of claim 16, wherein the signaling configures the one or more flexible ports and determines the path responsive to an input from a network management system or from another network element.

18. The network of claim 16, wherein the signaling configures the one or more flexible ports and determines the path responsive to detecting an input port type and destination reference on one of the one or more flexible ports.

19. The network of claim 16, wherein the control plane comprises one or more of Automatically Switched Optical Network, or Provider Backbone Transport with path routing extensions; and
wherein the signaling comprises one or more of Resource Reservation Protocol, Label Distribution Protocol, Private Network to Network Interface, Session Initiation Protocol, Extensible Mark-up Language, Rapid Spanning Tree Protocol, a Type-Length-Value added to the Resource Reservation Protocol—Traffic Engineering, Session Description Protocol (SDP), or proprietary signaling.

* * * * *